United States Patent
Matthews

[11] Patent Number: 5,590,398
[45] Date of Patent: Dec. 31, 1996

[54] VIRTUAL MOBILE LOCATION AREA

[75] Inventor: Adrian S. Matthews, Middlesex, N.J.

[73] Assignee: Lucent Technologies Inc., Murray Hill, N.J.

[21] Appl. No.: 410,420

[22] Filed: Mar. 27, 1995

Related U.S. Application Data

[63] Continuation of Ser. No. 191,565, Feb. 3, 1994, abandoned.

[51] Int. Cl.⁶ .................................................. H04Q 7/22
[52] U.S. Cl. ...................... 455/33.1; 455/56.1; 455/54.2; 379/59
[58] Field of Search .............................. 455/333.1, 33.2, 455/33.4, 54.1, 54.2, 56.1, 53.1, 51.1, 51.2; 379/59, 60

[56] References Cited

U.S. PATENT DOCUMENTS 4,876,738  10/1989  Selby ............................ 455/56.1 X
5,101,500  3/1992  Marui ............................... 379/60
5,212,822  5/1993  Fukumine et al. ................ 455/33.1
5,305,466  4/1994  Taketsugu ........................ 455/33.1
5,369,684  11/1994  Buhl et al. ...................... 455/33.1 X

FOREIGN PATENT DOCUMENTS

WO9213428  12/1991  WIPO.
WO9222174  6/1992  WIPO.

Primary Examiner—Reinhard J. Eisenzopf
Assistant Examiner—Philip J. Sobutka

[57] ABSTRACT

A Virtual Mobile Location Area (VMLA) personalized to the particular roaming habits of a mobile phone user, employing predetermined grouping of cells arranged in the order of likelihood that the mobile phone users will be in that grouping.

5 Claims, 2 Drawing Sheets

VIRTUAL MOBILE LOCATION AREA

This application is a file wrapper continuation application of U.S. application, Ser. No. 08/191,565, filed Feb. 3, 1994 now abandoned.

This invention relates to cellular telephone network systems. More particularly, the invention relates to the method within cellular telephone network systems for locating each mobile telephone station in the system and provides a personalized location area for each mobile station.

BACKGROUND OF THE INVENTION

Mobile telephones systems rely on radio waves to provide communication between the fixed wire network and the mobile station (MS). Base Stations (BS) are geographically fixed radio frequency transmitters and receivers that provide the radio wave communication between the network and the individual mobile station. Each base station is limited by power requirements and frequency availability to the size of the geographical area that can be covered by each base station.

Thus, a system of adjacent cells, each having a base station transmitter-receiver has been developed. The cells are clustered into groups that are controlled by mobile service switching centers (MSC) that function to provide communication between the cell cluster associated with the particular MSC and the remainder of the network. Clusters are typically comprised of four, seven or twelve cells, however, many cell clusters of other numbers of cells exist. To a great extent, the cell cluster size is influenced by the number of base stations that can provide a manageable paging function. In effect, every base station in the cell cluster simultaneously page a particular mobile station when a call is placed from the network to that mobile station. The cell clusters are commonly referred to as mobile location areas (MLA) or Local Areas (LA).

Each mobile station must be identifiable for billing, network connection and paging purposes. Therefore, registers are provided in the network to serve as the repository of the identification information needed for each mobile station.

Each MLA is controlled by a MSC that has a Home Location Register (HLR) and a Visitor Location Register (VLR) associated with it; the HLR providing a register for mobile stations that are assigned to that particular cluster and the VLR providing a register for mobile stations as the mobile station travels into the MLA.

Further, each mobile station is provided with means to continuously determine if it is located in its home MLA. When the mobile station moves from its home MLA to another MLA it must register in the VLR of the MLA in which it is physically located. The main disadvantage of registering in a MLA as a visitor is the diversion of the base station transceiver to registration usage rather than network transmission capacity. Thus, minimizing the use of a base station digital control channel for signalling traffic will result in the availability of more bandwidth which can be transformed into communication services.

SUMMARY OF THE INVENTION

The present invention ameliorates the burden of registering mobile stations when the mobile stations move between mobile location areas (MLA) and enables the system to dedicate greater capacity to call load.

Further, the present invention provides a means compatible with existing cellular network systems that is available to offer an alternative to the fixed geographical system for allocating the HLR of a single MLA to each mobile station.

The present invention provides a Virtual Mobile Location Area (VMLA) that is personalized to a particular mobile station. The historical or professized calling pattern of the mobile station is analyzed and superimposed on the existing cellular network to determine an optimum VMLA for the particular mobile station. Rather than selecting a specific MLA to serve as the home location register (HLR) for the particular mobile station, adjacent base stations are included in the VMLA as a function of the real travel pattern of the mobile station.

DESCRIPTION OF THE DRAWINGS

The invention will be understood more clearly when viewed with the following drawings wherein.

DESCRIPTION OF THE PREFERRED EMBODIMENT

The subject invention has application in any cellular network wherein a plurality of radio transceivers are required to provide the radio wave communication between a fixed network and a mobile station. Multiple adjacent mobile local areas (MLA) are required to cover a large geographic area, such as a country or continent. Therefore, the existing cellular networks all comprise a plurality of adjacent MLAs and are suited for the application of VMLAs.

Figure 1:
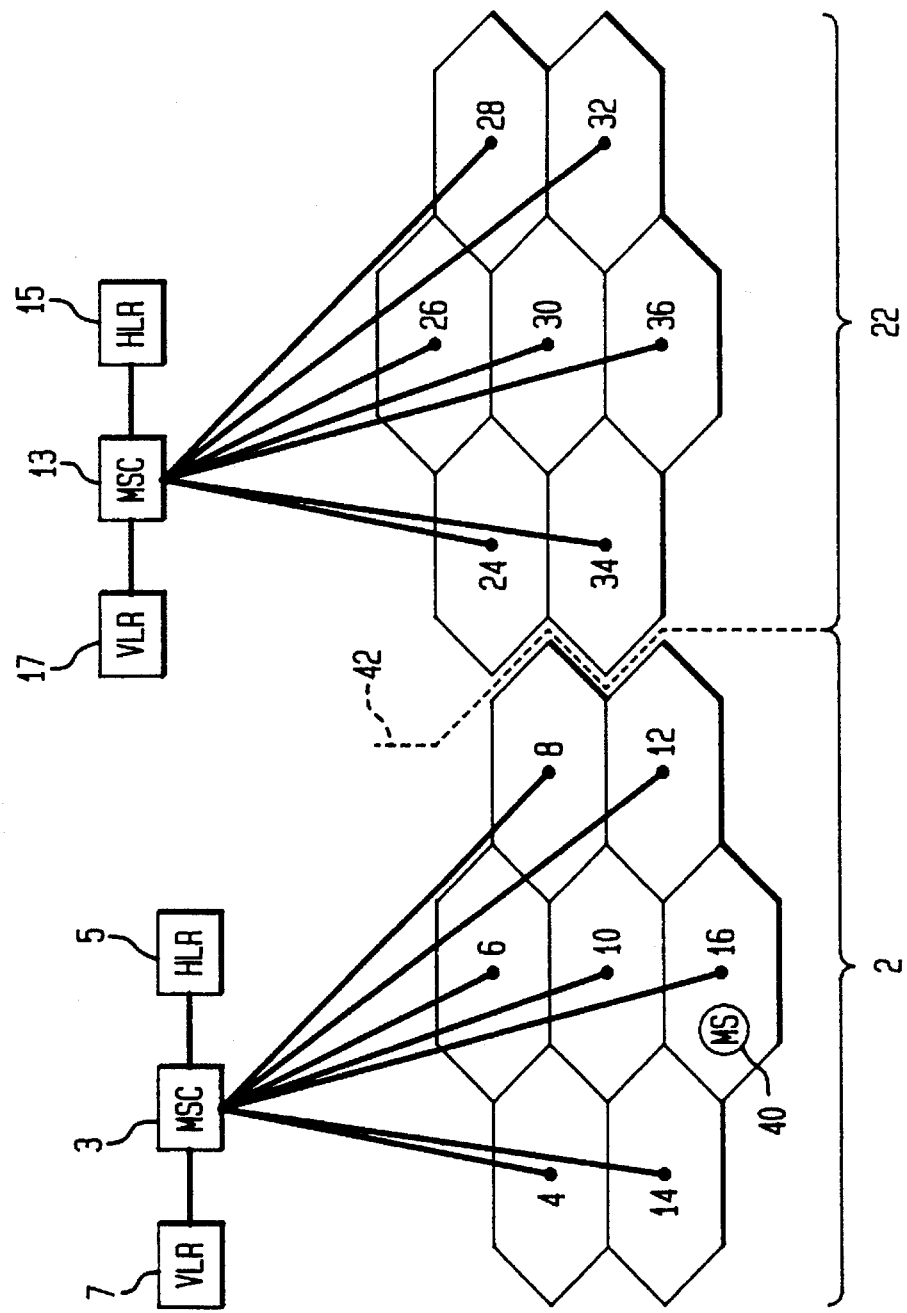
FIG. 1 is an illustration of a basic conventional arrangement of two adjacent MLA cell clusters.
Figure 2:
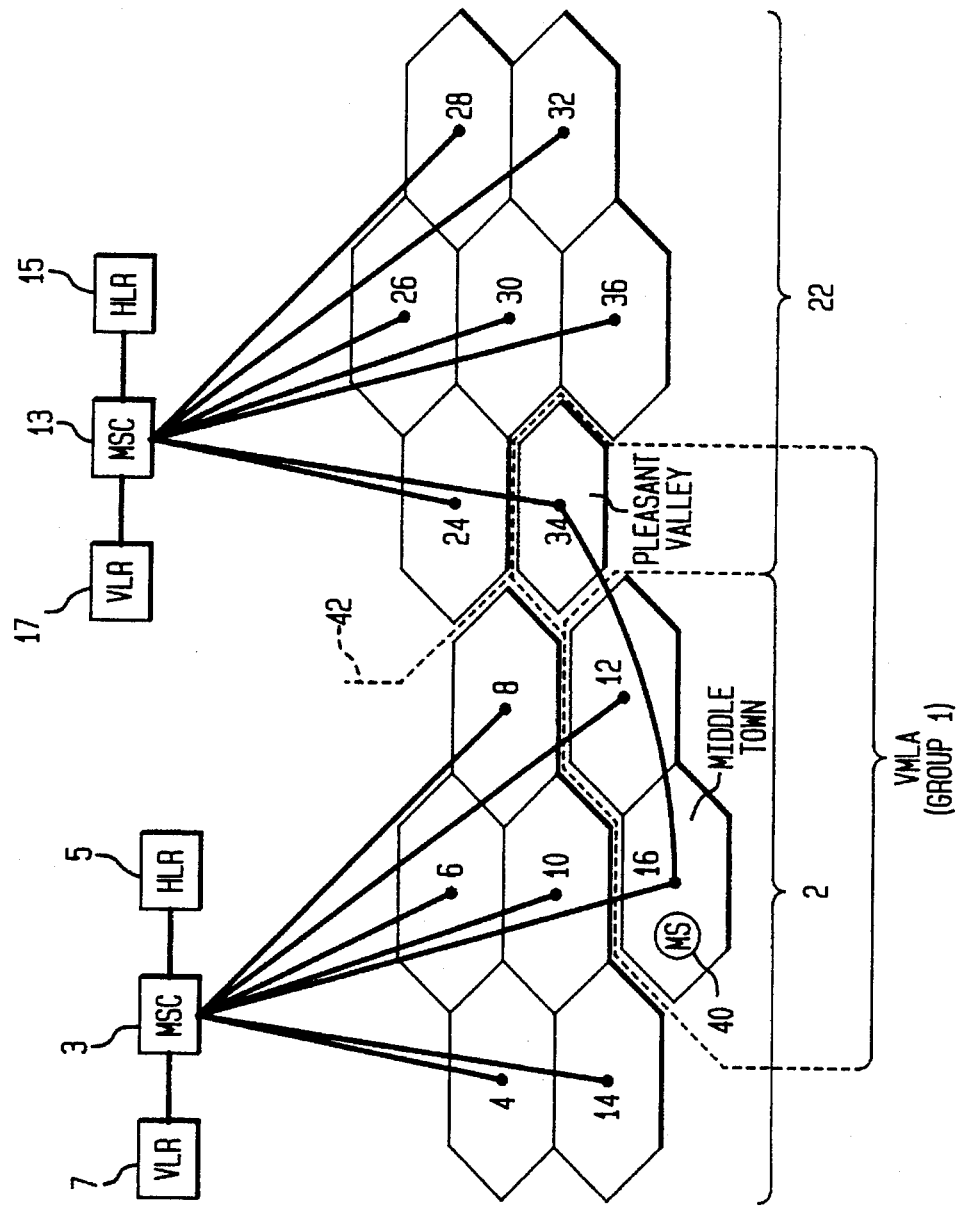
FIG. 2 is an illustration of a VMLA selected for a particular mobile station based on the call history of the mobile station.

Conventionally, as seen in FIGS. 1 and 2, a plurality of base stations 4, 6, 8, 10, 12, 14, 16 are arranged in a Mobile Local Area (MLA) 2 to optimize bandwidth frequency usage and network power. A second cell mobile Local Area 22 comprised of base stations 24, 26, 28, 30, 32, 34, 36 is shown adjacent to Mobile Local Area 2 to illustrate the operation of a conventional cellular network and facilitate description of the VMLA of this invention. A boundary 42 exists between Mobile Local Area 2 and Mobile Local Area 22.

In the current conventional system, a mobile station 40 is assigned to mobile Local Area 2 on the basis of the geographical location in which the mobile station is customarily garaged. Therefore, mobile station 40 is registered in Home Location Register (HLR) 5 of Mobile Local Area 2. When mobile station 40 travels out of Mobile Local Area 2 the mobile station 40 automatically signals the new Local Area in which the mobile station 40 has entered and the requisite data associated with the mobile station 40 is entered in the visitors location register (VLR) of the Mobile Local Area. For example, if mobile station 40 travels to Mobile Local Area 22, the requisite data associated with mobile station 40 will be registered in VLR 17.

As seen in FIG. 2, a personal VMLA has been created for mobile station 40 based on the calling habits of mobile station 40. As an illustration, assume experience has shown that mobile station 40 is an automobile owned and used by a man who lives in Middletown, has his office in Pleasant Valley and seldom travels in mobile station 40 anywhere other than between his home and office. A VLMA can be easily established for mobile station 40. Middletown is located in mobile local area 2 and in the cell in which base station 16 is the network transceiver. Pleasant Valley is in Local Area 22 and in the cell in which base station 34 is the network transceiver. The road or highway system used by mobile station 40 to travel between Middletown and Pleasant Valley passes through the cell in Mobile Local Area 2 in which base station 12 is the transceiver. Thus, the VMLA most appropriate for mobile station 40 is comprised of the cells in which base stations 16, 12 and 34 are located. However, because base stations 16 and 12 are in Local Area 2 and base station 34 is in Local Area 22 mobile station 40 will be registered in both the home location registers 5 and 15. Rather than registering each time mobile unit 40 crosses the boundary 42 mobile station 40 will be paged by all of the base stations in Local Areas 2 and 22 when an incoming call is made to mobile station 40.

In particular, the cells 4, 6, 8, 10, 12, 14 and 16 of Local Area 2 and the cells 24, 26, 28, 30, 32, 34 and 36 of Local Area 22 are divided into three groups for ordered paging purposes. The first group is the predetermined VMLA defined for the mobile station 40, which comprises cells 16, 12 and 34 and which spans across the Local Areas 2 and 22. The remaining cells 4, 6, 8, 10 and 14 of Local Area 2 are defined as group 2, and the remaining cells 24, 26, 28, 30, 32 and 36 of Local Area 22 are defined as group 3.

A further determination is then made as to the likelihood that the mobile station 40 is in group 2 or group 3 when not found in group 1 (which is the VMLA). Assuming that, based on business considerations, the probability that the mobile station 40 will be found in group 2 is higher than the probability that it will be found in group 3. Then, in terms of locating the mobile station 40 within the grouped regions of Local Areas 2 and 22, and ordering the groups from the highest to the lowest probability of locating the mobile station 40, the result is {Group 1, Group 2, Group 3}. Paging bandwidth is now optimized when, for an incoming call directed to the mobile station 40, it is sequentially paged in the regions as they are grouped and ordered. Thus, queuing delays are minimized in high traffic systems. Bandwidth is cleared by the present invention to allow for quick paging of mobile stations that are located in the other cells within the Local Areas 2 and 22 for which another incoming call must be directed.

I claim:

1. In a cellular telephone network comprising a plurality of local areas, each local area comprising a plurality of base stations and having associated therewith a home location register to indicate which mobile stations in the network are registered in that particular local area, a method for locating mobile stations comprising:

determining the call habits of a mobile station;

determining the base stations that the habits of the mobile station indicate the mobile station will most likely use to initiate and receive calls;

arranging the cells that contain the base stations that the habits of the mobile station indicate the mobile station will most likely use to initiate and receive calls into a group, called a Virtual Mobile Location Area (VMLA), and assigning said VMLA to said mobile station, wherein said VMLA is only modified when the call habits of said mobile station indicate that said mobile station has entered a new cell, having a new base station contained therein, more than once; and registering the mobile station with each home location register in the local area associated with every base station that the habits of the mobile station indicate will most likely be used by the mobile station.

2. In a cellular telephone network comprising a plurality of local areas, each local area comprising a plurality of base stations and having associated therewith a home location register to indicate which mobile stations in the network are registered in that particular local area, a method for locating mobile stations comprising:

determining the call habits of a mobile station;

determining the base stations that the habits of the mobile station indicate the mobile station will most likely use to initiate and receive calls, arranging the cells which contain said base stations into a group, called a Virtual Mobile Location Area (VMLA), and assigning said VMLA to said mobile station, wherein said VMLA is only modified when the call habits of said mobile station indicate that said mobile station has entered a new cell, having a new base station contained therein, more than once;

registering the mobile station with each home location register in the local area associated with every base station that the habits of the mobile station indicate will most likely be used by the mobile station;

arranging into groups the base stations remaining in each local area which have not already been determined to be most likely used by the mobile station;

determining in which group of remaining base stations the mobile station would next likely be; and repeating the previous step for each group of base stations so that a paging order of groups is established, said paging order proceeding from the most likely group to the least likely group.

3. The cellular telephone network of claim 2, wherein said VMLA is defined as a first group of base stations in said paging order.

4. The cellular telephone network of claim 3, wherein the local area in which said mobile station is customarily stationed is defined as a second group of base stations in said paging order, wherein said second group of base stations excludes said first group of base stations.

5. The cellular telephone network of claim 4, wherein the remaining base stations comprise a third group of base stations in said paging order.

* * * * *